US009035119B2

(12) United States Patent
Ewart et al.

(10) Patent No.: US 9,035,119 B2
(45) Date of Patent: May 19, 2015

(54) OLIGOMERISATION OF OLEFINIC COMPOUNDS IN THE PRESENCE OF AN ACTIVATED OLIGOMERISATION CATALYST

(75) Inventors: Sean William Ewart, Pearland, TX (US); Brian William Stirling Kolthammer, Lake Jackson, TX (US); David Matthew Smith, Fife (GB); Martin John Hanton, Fife (GB); John Thomas Dixon, Vanderbijlpark (ZA); David Hedley Morgan, Vanderbijlpark (ZA); Henriette De Bod, Roodepoort (ZA); William Fullard Gabrielli, Fife (GB); Stephen John Evans, Weltevredenpark (ZA)

(73) Assignee: Sasol Technology (PTY) Limited, Johannesburg (ZA)

( * ) Notice: Subject to any disclaimer, the term of this patent is extended or adjusted under 35 U.S.C. 154(b) by 942 days.

(21) Appl. No.: 13/201,306

(22) PCT Filed: Feb. 15, 2010

(86) PCT No.: PCT/IB2010/050665
§ 371 (c)(1),
(2), (4) Date: Oct. 24, 2011

(87) PCT Pub. No.: WO2010/092554
PCT Pub. Date: Aug. 19, 2010

(65) Prior Publication Data
US 2012/0041241 A1 Feb. 16, 2012

(30) Foreign Application Priority Data

Feb. 16, 2009 (ZA) .................................... 2009/1074

(51) Int. Cl.
*C07C 2/02* (2006.01)
*C07C 4/02* (2006.01)
(Continued)

(52) U.S. Cl.
CPC ............ *B01J 31/188* (2013.01); *B01J 31/0239* (2013.01); *B01J 31/143* (2013.01); *B01J 31/146* (2013.01); *B01J 2231/20* (2013.01); *B01J 2531/62* (2013.01); *B01J 2531/90* (2013.01)

(58) Field of Classification Search
USPC .......... 502/103, 104, 121, 123; 585/502, 510, 585/511, 512, 513, 520, 521, 522, 523
See application file for complete search history.

(56) References Cited

U.S. PATENT DOCUMENTS 5,750,817 A * 5/1998 Tanaka et al. .................. 585/520
6,800,702 B2 * 10/2004 Wass ........................... 526/124.3
2009/0062493 A1 * 3/2009 De Boer et al. ............... 526/145

FOREIGN PATENT DOCUMENTS

WO      WO 02/04119 A1    1/2002
WO      WO 2007/138545 A2  12/2007

OTHER PUBLICATIONS

McGuinness, et al., "Ethylene Tri- and Tetramerization with Borate Cocatalysts: Effects on Activity, Selectivity, and Catalyst Degradation Pathways" in Organometallics, 2007, 26, 1108-1111—Jan. 2007.*

(Continued)

*Primary Examiner* — In Suk Bullock
*Assistant Examiner* — Aaron Pierpont
(74) *Attorney, Agent, or Firm* — Finnegan Henderson Farabow Garrett & Dunner LLP

(57) ABSTRACT

This invention relates to the oligomerization of olefinic compounds in the presence of an activated oligomerization catalyst. The invention also extends to a particular manner for providing an activated oligomerization catalyst. According to the present invention, there is provided a process for producing an oligomeric product by the oligomerization of at least one olefinic compound, the process including (a) providing an activated oligomerization catalyst by combining, in any order, iii) a source of chromium, iv) a ligating compound of the formula $(R^1)mX^1(Y)X^2(R^2)n$ wherein $X^1$ and $X^2$ are independently an atom selected from the group consisting of nitrogen, phosphorus, arsenic, antimony, bismuth, oxygen, sulphur and selenium or said atom oxidized by S, Se, N or O where the valence of $X^1$ and/or $X^2$ allows for such oxidation, Y is a linking group between $X^1$ and $X^2$ which linking group contains at least one nitrogen atom which is directly bonded to $X^1$ or $X^2$, m and n are independently 0, 1 or a larger integer, and $R^1$ and $R^2$ are independently hydrogen, a hydrocarbyl group, an organoheteryl group or a heterohydrocarbyl group, and the respective $R^1$ groups are the same or different when m>1, and the respective $R^2$ groups are the same or different when n>1, in) a catalyst activator which is an organoboron compound including a cation and a non-coordinating anion of the general formula $[(R^{10})xL^*-H]+[B(R^{20})4]^-$ wherein $L^*$ is an atom selected from the group consisting of N, S and P, the cation $[(R^{10})x L^*-H]^*$ is a Bronsted acid, x is an integer 1, 2 or 3, each $R^{10}$ is the same or different when x is 2 or 3 and each is a —H, hydrocarbyl group or a heterohydrocarbyl group, provided that at least one of $R^{10}$ comprises at least 6 carbon atoms and provided further that the total number of carbon atoms in $(R^{10})x$ collectively is greater than 12, $R^{20}$ independently at each occurrence is selected from the group consisting of hydride, dialkylamido, halide, alkoxide, aryloxide, hydrocarbyl, halosubstituted-hydrocarbyl radicals, halosubstituted-alkoxide, halosubstituted-aryloxide and a halosubstituted aromatic ring moiety with at least one halide substituent on the aromatic ring, and vi) an aliphatic solvent, and (b) contacting the at least one olefinic compound with the activated oligomerization catalyst to produce an oligomeric product.

22 Claims, No Drawings

(51) Int. Cl.
*B01J 19/00* (2006.01)
*C10G 9/00* (2006.01)
*B01J 31/18* (2006.01)
*B01J 31/14* (2006.01)
*B01J 31/02* (2006.01)

(56) References Cited

OTHER PUBLICATIONS

Structure and Nomenclature of Sulfonium Ions, available through SciFinder, American Chemical Society, Aug. 2014.*

International Search Report from the Australian Patent Office for International Application No. PCT/IB2010/050665, mailed Jun. 23, 2010.

McGuinness, D. S. et al., "Ethylene Tri- and Tetramerization with Borate Cocatalysts: Effects on Activity, Selectivity, and Catalyst Degradation Pathways," Organometallics, vol. 26, pp. 1108-1111, (2007).

Schofer, S. J. et al., "Ethylene Trimerization Catalysts Based on Chromium Complexes with a Nitrogen-Bridged Diphosphine Ligand Having ortho-Methoxyaryl or ortho-Thiomethoxy Substituents: Well-Defined Catalyst Precursors and Investigations of the Mechanism," Organometallics, vol. 25, pp. 2743-2749 (2006).

* cited by examiner

OLIGOMERISATION OF OLEFINIC COMPOUNDS IN THE PRESENCE OF AN ACTIVATED OLIGOMERISATION CATALYST

TECHNICAL FIELD

This invention relates to the oligomerisation of olefinic compounds in the presence of an activated oligomerisation catalyst. The invention also extends to a particular manner for providing an activated oligomerisation catalyst.

BACKGROUND ART

A number of different oligomerisation technologies are known to produce α-olefins. Some of these processes, including the Shell Higher Olefins Process and Ziegler-type technologies, have been summarized in WO 04/056479 A1. The same document also discloses that the prior art (e.g. WO 03/053891 and WO 02/04119) teaches that chromium based catalysts containing heteroaromatic ligands with both phosphorus and nitrogen heteroatoms, selectively catalyse the trimerisation of ethylene to 1-hexene.

Processes wherein transition metals and heteroaromatic ligands are combined to form catalysts for trimerisation, tetramerisation, oligomerisation and polymerisation of olefinic compounds have also been described in different patent applications such as WO 03/053890 A1; WO 03/053891; WO 04/056479 A1; WO 04/056477 A1; WO 04/056480 A1; WO 04/056478 A1; WO 05/123884 A2; WO 05/123633 A1 and U.S. Pat. No. 7,285,607.

The catalysts utilized in the abovementioned trimerisation, tetramerisation, oligomerisation or polymerisation processes all include one or more activators to activate the catalyst. Such an activator is a compound that generates an active catalyst when the activator is combined with the catalyst.

Suitable activators include organoaluminium compounds, organoboron compounds, organic salts, such as methyl lithium and methyl magnesium bromide, inorganic acids and salts, such as tetrafluoroboric acid etherate, silver tetrafluoroborate, sodium hexafluoroantimonate and the like.

A common catalyst activator used in combination with Cr based catalysts for oligomerisation of olefinic compounds is alkylaluminoxane, particularly methylaluminoxane (MAO). It is well known that MAO includes significant quantities of alkylaluminium in the form of trimethylaluminium (TMA), and in effect the catalyst activator is a combination of TMA and MAO. The MAO may also be replaced with modified MAO (MMAO).

Activators containing aluminium compounds are costly to the effect that it impacts significantly on process economics of olefin oligomerisation technologies that utilize this class of activators. For this reason, it is desirable to run commercial oligomerisation processes at low activator concentrations. However, in the case where an aluminium-containing compound was used as an activator for transition metal based oligomerisation catalysts, it was found that at conditions of low starting aluminium concentrations (e.g. <6 mmol/l), low reaction rates and high levels of unwanted solid formation (polyethylene (PE) and waxes) resulted when ethylene was oligomerised. This presented a major hurdle, since low final aluminium concentrations during catalysis is required and desirable for successful commercial operation.

The use of organoboron compounds as catalyst activators is known.

WO 07/088,329 relates to a transition metal catalyst system for the trimerisation and tetramerisation of olefins. The catalyst system comprises a transition metal compound, particularly chromium metal compounds, a diphosphine ligand and a catalyst activator. The specification mentions that the catalyst activator may be an organoaluminium compound, an organoboron compound or an inorganic acid and salt. However it contains no exemplification of the use of any of the organoboron compounds mentioned therein as activator. Such mentioned organoboron compounds as are mentioned in lines 18-23 on page 5 of that specification. The exemplifications of the processes for the trimerisation and tetramerisation of ethylene provided by WO 07/088,329 are all carried out in either chlorobenzene or toluene and no examples of processes conducted in aliphatic solvents are provided.

U.S. Pat. No. 5,919,983 teaches of a catalyst activator for use in the polymerization of α-olefins, using Ziegler-Natta and Metallocene polymerisation catalysts to form high molecular weight polymers. The activators taught are boron salts that respectively comprises a cation which is a Bronsted acid capable of donating a proton, and an inert, non-coordinating anion which includes a boron atom. The skilled person knows that Ziegler-Natta and Metallocene polymerisation technology belongs to a different art field and is fundamentally different to selective oligomerisation technologies.

In IPCOM000031729D, published on 7 Oct. 2004, boron-containing activators were used to activate selective oligomerisation catalyst systems in toluene or an aromatic solvent. When $[Ph_3C]^+[B(C_6F_5)_4]^-$ and $B(C_6F_5)_3$ was used to activate these catalysts, a low productivity catalyst was obtained with the highest productivities observed being around 15000 g/gCr.

It has now been found that the borate activators described herein leads to improved productivity of oligomerisation catalysts, when used in the presence of an aliphatic solvent.

The inventors of the present invention have accordingly found that using borate activators in the oligomerisation process described hereunder results in improved catalyst activation, increased catalyst efficiency and reduced solids formation, which improvements are herein collectively referred to as improved productivity of the activated catalyst.

DISCLOSURE OF THE INVENTION

According to the present invention, there is provided a process for producing an oligomeric product by the oligomerisation of at least one olefinic compound, the process including (a) providing an activated oligomerisation catalyst by combining, in any order,
  i) a source of chromium;
  ii) a ligating compound of the formula

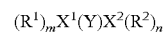

wherein:
    $X^1$ and $X^2$ are independently an atom selected from the group consisting of nitrogen, phosphorus, arsenic, antimony, bismuth, oxygen, sulphur and selenium or said atom oxidized by S, Se, N or O where the valence of $X^1$ and/or $X^2$ allows for such oxidation;
    Y is a linking group between $X^1$ and $X^2$ which linking group contains at least one nitrogen atom which is directly bonded to $X^1$ or $X^2$;
    m and n are independently 0, 1 or a larger integer; and
    $R^1$ and $R^2$ are independently hydrogen, a hydrocarbyl group, an organoheteryl group or a heterohydrocarbyl group, and the respective $R^1$ groups are the same or different when m>1, and the respective $R^2$ groups are the same or different when n>1;

iii) a catalyst activator which is an organoboron compound including a cation and a non-coordinating anion of the general formula $$[(R^{10})_xL^*-H]^+[B(R^{20})_4]^-$$

wherein:
L* is an atom selected from the group consisting of N, S and P; the cation $[(R^{10})_xL^*-H]^+$ is a Bronsted acid;
x is an integer 1, 2 or 3;
each $R^{10}$ is the same or different when x is 2 or 3 and each is a —H, hydrocarbyl group or a heterohydrocarbyl group;
provided that at least one of $R^{10}$ comprises at least 6 carbon atoms and provided further that the total number of carbon atoms in $(R^{10})_x$ collectively is greater than 12;
$R^{20}$ independently at each occurrence is selected from the group consisting of hydride, dialkylamido, halide, alkoxide, aryloxide, hydrocarbyl, halosubstituted-hydrocarbyl radicals, halosubstituted-alkoxide, halosubstituted-aryloxide and a halosubstituted aromatic ring moiety with at least one halide substituent on the aromatic ring; and
iv) an aliphatic solvent; and
(b) contacting the at least one olefinic compound with the activated oligomerisation catalyst to produce an oligomeric product.

According to the present invention there is also provided a process for activating an oligomerisation catalyst to produce an oligomeric product, the process comprising the combination, in any order, of
i) a source of chromium;
ii) a ligating compound of the formula $$(R^1)_mX^1(Y)X^2(R^2)_n$$

wherein:
$X^1$ and $X^2$ are independently an atom selected from the group consisting of nitrogen, phosphorus, arsenic, antimony, bismuth, oxygen, sulphur and selenium or said atom oxidized by S, Se, N or O where the valence of $X^1$ and/or $X^2$ allows for such oxidation;
Y is a linking group between $X^1$ and $X^2$ which linking group contains at least one nitrogen atom which is directly bonded to $X^1$ or $X^2$;
m and n are independently 0, 1 or a larger integer; and
$R^1$ and $R^2$ are independently hydrogen, a hydrocarbyl group an organoheteryl group or a heterohydrocarbyl group, and the respective $R^1$ groups are the same or different when m>1, and the respective $R^2$ groups are the same or different when n>1;
iii) a catalyst activator which is an organoboron compound including a cation and a non-coordinating anion of the general formula $$[(R^{10})_xL^*-H]^+[B(R^{20})_4]^-$$

wherein:
L* is an atom selected from the group consisting of N, S and P; the cation $[(R^{10})_xL^*-H]^+$ is a Bronsted acid;
x is an integer 1, 2 or 3;
each $R^{10}$ is the same or different when x is 2 or 3 and each is a —H, hydrocarbyl group or a heterohydrocarbyl group;
provided that at least one of $R^{10}$ comprises at least 6 carbon atoms and provided further that the total number of carbon atoms in $(R^{10})_x$ collectively is greater than 12;

$R^{20}$ independently at each occurrence is selected from the group consisting of hydride, dialkylamido, halide, alkoxide, aryloxide, hydrocarbyl, halosubstituted-hydrocarbyl radicals, halosubstituted-alkoxide, halosubstituted-aryloxide and a halosubstituted aromatic ring moiety with at least one halide substituent on the aromatic ring; and
iv) an aliphatic solvent.

In this specification, the following definitions apply:
The term olefinic compound denotes an olefin or any compound which includes a carbon to carbon double bond and olefinic moiety has a corresponding meaning;

A hydrocarbyl group is a univalent group formed by removing one hydrogen atom from a hydrocarbon;

A hydrocarbylene group is a divalent group formed by removing two hydrogen atoms from the same or different carbon atoms in a hydrocarbon, the resultant free valencies of which are not engaged in a double bond;

A heterohydrocarbyl group is a univalent group formed by removing one hydrogen atom from a heterohydrocarbon, that is a hydrocarbon compound which includes at least one hetero atom (that is, not being H or C), and which group binds with other moieties through the resultant free valency on that carbon atom;

A heterohydrocarbylene group is a divalent group formed by removing two hydrogen atoms from the same or different carbon atoms in a heterohydrocarbon, the free valencies of which are not engaged in a double bond and which group binds with other moieties through the resultant free valencies on that or those carbon atoms; and An organoheteryl group is a univalent group containing carbon atoms and at least one hetero atom, and which has its free valence at an atom other than carbon.

The oligomerisation catalyst of the present invention is preferably a trimerisation catalyst or a tetramerisation catalyst.

The oligomerisation process for producing an oligomeric product is preferably a trimerisation process for producing a trimeric product by the utilization of a trimerisation catalyst or a tetramerisation process for producing a tetrameric product by utilization of a tetramerisation catalyst.

The inventors of the present invention have surprisingly found that under the conditions stated above, the solubility of the catalyst activator is increased in aliphatic compounds. Furthermore, oligomerisation in the presence of a catalyst so activated does not result in unacceptable high polymerisation products such as solids formation (polyethylene (PE) and waxes).

Oligomerisation Catalyst

The oligomerisation catalyst may be any suitable oligomerisation catalyst.

In one embodiment of the invention, the oligomerisation catalyst includes a combination of:
(i) a source of chromium;
(ii) a ligating compound of the formula $$(R^1)_mX^1(Y)X^2(R^2)_n$$

wherein:
$X^1$ and $X^2$ are independently an atom selected from the group consisting of nitrogen, phosphorus, arsenic, antimony, bismuth, oxygen, sulphur and selenium or said atom oxidized by S, Se, N or O where the valence of $X^1$ and/or $X^2$ allows for such oxidation;
Y is a linking group between $X^1$ and $X^2$ which linking group contains at least one nitrogen atom which is directly bonded to $X^1$ or $X^2$;
m and n are independently 0, 1 or a larger integer; and R¹ and R² are independently hydrogen, a hydrocarbyl group, an organoheteryl group or a heterohydrocarbyl group, and the respective R¹ groups are the same or different when m>1, and the respective R² groups are the same or different when n>1.

Source of Chromium (i):

The source of chromium may be an inorganic salt, an organic salt, a coordination compound or an organometallic complex of chromium.

Preferably the source of chromium is selected from the group consisting of chromium trichloride tris-tetrahydrofuran complex; (benzene)tricarbonyl chromium; chromium (III) octanoate; chromium hexacarbonyl; chromium (III) acetylacetonate, chromium (III) naphthenate, chromium (III) 2-ethylhexanoate, chromium (III) acetate, chromium (III) 2,2,6,6-tetramethylheptadionate, chromium (III) chloride. Preferably it is chromium (III) acetylacetonate.

Ligating Compound (II):

$X^1$ and/or $X^2$ may be a potential electron donor for coordination with the chromium referred to in (i).

An electron donor is defined as an entity that donates electrons used in chemical, including dative covalent, bond formation.

$X^1$ and/or $X^2$, may be independently oxidised by S, Se, N or O.

$X^1$ and/or $X^2$ may be independently phosphorus or phosphorus oxidised by S or Se or N or O. Preferably $X^1$ and $X^2$ are the same, and preferably both are P.

It will be appreciated that m and n are dependent on factors such as the valence and oxidation state of $X^1$ and $X^2$, bond formation of Y with $X^1$ and $X^2$ respectively, and bond formation of R¹ and R² with $X^1$ and $X^2$ respectively. Preferably both m and n are not 0.

Preferably the ligating compound is a bidentate ligand.
Preferably the ligating compound is of the formula

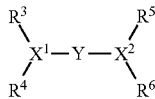

wherein Y is as defined herein $X^1$ and $X^2$ are independently selected from the group consisting of nitrogen, phosphorus, arsenic, antimony and bismuth and R³ to R⁶ are each independently a hydrocarbyl group or a heterohydrocarbyl group.

Preferably $X^1$ and $X^2$ are independently selected from the group consisting of phosphorus and nitrogen. Preferably $X^1$ and $X^2$ are the same. Preferably both $X^1$ and $X^2$ are phosphorus.

One or more of R³ to R⁶ may be a substituted hydrocarbyl group or a substituted heterohydrocarbyl group, wherein at least one substituent is bound to a hydrocarbyl group or a heterohydrocarbyl group.

In this specification, a substituent with reference to compounds bound to $X^1$ and/or $X^2$ is a moiety (excluding H) that is bound to a linear structure or a cyclic structure bound to $X^1$ and/or $X^2$, but the substituent does not form part of the linear or cyclic structure.

The linear or cyclic structure may be selected from the group consisting of a linear hydrocarbyl, a linear heterohydrocarbyl, a cyclic hydrocarbyl and a cyclic heterohydrocarbyl group. Linear hydrocarbyl may be selected from the group methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, ethynyl, propynyl, butynyl, pentynyl, hexynyl, heptynyl, octynyl, nonynyl and decynyl.

Linear heterohydrocarbyl may include methoxy, ethoxy, thiomethoxy, thioethoxy, methylsilyl, ethylsilyl, methylamino, methylphosphino, methoxymethyl and thiomethoxymethyl. Cyclic hydrocarbyl may include cyclopropyl, cyclobutyl, cyclopentyl, cyclohexyl, cycloheptyl, cyclooctyl, cyclononyl, cyclodecyl, cyclopentenyl, cyclohexenyl, cyclo-octenyl, phenyl, cyclopentadienyl, naphthaleneyl, norbornyl, adamantyl, phenanthreneyl, anthraceneyl, phenaleneyl, tetrahydronaphthaleneyl, decalinyl, indenyl and tetrahydroindenyl. Cyclic heterohydrocarbyl may include tetrahydrofuranyl, tetrahydrothiopheneyl, pyrrolideneyl, piperidineyl, pyrrolineyl, oxazolyl, thiazolyl, furanyl, thiopheneyl, pyrazolinyl, pyrazolyl, imidazolyl, benzofuranyl, coumaranyl and indolyl.

R³ to R⁶ may also be selected from a group of metallocenes such as a ferroceneyl, zirconoceneyl and titanoceneyl group.

Preferably none of R³ to R⁶ are aromatic with a ring atom of the aromatic ring structure bound to either $X^1$ or $X^2$ and with a polar substituent as a non-ring atom bound to a ring atom of the aromatic ring structure adjacent to the ring atom bound to $X^1$ or $X^2$.

In this specification, a polar substituent is a substituent with a permanent electric or induced dipole moment.

Preferably, if two or more of R³ to R⁶ are aromatic with a ring atom of the aromatic ring structure bound to either $X^1$ and $X^2$ not more than two of said aromatic R³ and R⁶ have a substituent as a non-ring atom bound to a ring atom of the aromatic ring structure adjacent to the ring atom bound to $X^1$ or $X^2$.

In one embodiment of the invention, R³ to R⁶ are the same or different and each is a hydrocarbyl group, or a heterohydrocarbyl group (preferably an organyl group) which contains no substituent or contains a non-polar substituent. Preferably each of R³ to R⁶ does not include any polar substituent. In one embodiment of the invention at least two of (but preferably all of) R³ to R⁶ are aromatic with a ring atom of the aromatic ring structure bound to $X^1$ or $X^2$, but preferably not more than two of said aromatic R³ to R⁶ have a non-polar substituent other than H as a non-ring atom bound to a ring atom of the aromatic ring structure adjacent to the ring atom bound to $X^1$ or $X^2$.

Preferably none of the aromatic R³ to R⁶ have a non-polar substituent as a non-ring atom bound to a ring atom of the aromatic ring structure adjacent to the ring atom bound to $X^1$ or $X^2$. Preferably all of aromatic R³ to R⁶ are non-substituted aromatic compounds. R³ to R⁶ may be independently selected from the group consisting of a non-aromatic compound; an aromatic compound; and a heteroaromatic compound. Preferably each of R³ to R⁶ is an aromatic or heteroaromatic compound, more preferably an aromatic compound (including a substituted aromatic compound). The aromatic compound (or substituted aromatic compound) may comprise phenyl or a substituted phenyl.

In this specification, a non-polar substituent is a substituent without a permanent electric or induced dipole moment.

Examples of suitable non-polar substituents include, but are not limited to, methyl, ethyl, ethenyl, propyl, iso-propyl, cyclopropyl, propenyl, propynyl, butyl, sec-butyl, tertiary-butyl, cyclobutyl, butenyl, butynyl, pentyl, isopentyl, neopentyl, cyclopentyl, pentenyl, pentynyl, hexyl, sec-hexyl, cyclohexyl, 2-methylcyclohexyl, 2-ethylcyclohexyl, 2-isopropylcyclohexyl, cyclohexenyl, hexenyl, hexynyl, octyl, cyclo-octyl, cyclo-octenyl, decyl, benzyl, phenyl, tolyl, xylyl, o-methylphenyl, o-ethylphenyl, o-isopropylphenyl, o-t-butylphenyl, cumyl, mesityl, biphenyl, naphthyl, anthracenyl, and the like.

Any one of $R^3$ to $R^6$ may be independently linked to one or more of each other, or to Y to form a cyclic structure.

$R^3$ and $R^4$ may be the same and $R^5$ and $R^6$ may be the same. $R^3$ to $R^6$ may all be the same.

In another embodiment of the invention, $R^3$ to $R^6$ are the same or different and each is a hydrocarbyl group, or a heterohydrocarbyl group (preferably an organyl group), provided that at least one of $R^3$ to $R^6$ contains a polar substituent on a carbon atom, but not one of $R^3$ to $R^6$ contains a polar substituent on a carbon atom of $R^3$ to $R^6$ adjacent to a carbon atom bound to $X^1$ or $X^2$. One or more or all of $R^3$ to $R^6$ may be independently selected from the group consisting of a substituted non-aromatic compound; a substituted aromatic compound; and a substituted heteroaromatic compound. Preferably each of $R^3$ to $R^6$ is a substituted aromatic or a substituted heteroaromatic compound, more preferably a substituted aromatic compound. The substituted aromatic compound may comprise a substituted phenyl. In one embodiment of the invention at least two of (but preferably all of) $R^3$ to $R^6$ are aromatic with a ring atom of the aromatic ring structure bound to $X^1$ or $X^2$, but preferably not more than two of said aromatic $R^3$ to $R^6$ have a substituent as a non-ring atom bound to a ring atom of the aromatic ring structure adjacent to the ring atom bound to $X^1$ or $X^2$.

Any polar substituent on one or more of $R^3$, $R^4$, $R^5$ and $R^6$ may be electron donating.

Suitable polar substituents may be a methoxy, ethoxy, isopropoxy, $C_3$-$C_{20}$ alkoxy, phenoxy, methoxymethyl, methylthiomethyl, 1,3-oxazolyl, methoxymethoxy, hydroxyl, amino, pentafluorophenoxy, tosyl, methylsulfanyl, trimethylsiloxy, dimethylamino, sulphate, nitro, halides or the like.

Y may be selected from the group consisting of an inorganic linking group comprising either a single- or two-atom linker spacer; and a group comprising 1,2-diarylhydrazine-1,2-diyl (—N(Ar)—N(Ar)—) where Ar is an aryl group; 1,2-dialkylhydrazine-1,2-diyl (—N(Alk)-N(Alk)-) where Alk is an alkyl group; —B($R^7$)—, —Si($R^7$)$_2$—, —P($R^7$)— and —N($R^7$)— where $R^7$ is hydrogen, a hydrocarbyl or heterocarbyl or halogen. Preferably, Y may be —N($R^7$)— and $R^7$ may be selected from the group consisting of hydrogen, alkyl, substituted alkyl, aryl, substituted aryl, aryloxy, substituted aryloxy, halogen, alkoxycarbonyl, carbonyloxy, alkoxy, aminocarbonyl, carbonylamino, dialkylamino, silyl groups or derivatives thereof, and aryl substituted with any of these substituents. Preferably $R^7$ may be a hydrocarbyl or a heterohydrocarbyl or an organoheteryl group. $R^7$ may be methyl, ethyl, propyl, isopropyl, cyclopropyl, allyl, butyl, tertiary-butyl, sec-butyl, cyclobutyl, pentyl, isopentyl, 1,2-dimethylpropyl(3-methyl-2-butyl), 1,2,2-trimethylpropyl(R/S-3,3-dimethyl-2-butyl), 1-(1-methylcyclopropyl)-ethyl, neopentyl, cyclopentyl, cyclohexyl, cycloheptyl, cyclo-octyl, decyl, cyclodecyl, 1,5-dimethylheptyl, 2-naphthylethyl, 1-naphthylmethyl, adamantylmethyl, 1-adamantyl, 2-adamantyl, 2-isopropylcyclohexyl, 2,6-dimethylcyclohexyl, cyclododecyl, 2-methylcyclohexyl, 3-methylcyclohexyl, 4-methylcyclohexyl, 2-ethylcyclohexyl, 2-isopropylcyclohexyl, 2,6-dimethyl-cyclohexyl, exo-2-norbornanyl, isopinocamphenyl, dimethylamino, phthalimido, pyrrolyl, trimethylsilyl, dimethyl-tertiary-butylsilyl, 3-trimethoxysilanepropyl, indanyl, cyclohexanemethyl, 2-methoxyphenyl, 3-methoxyphenyl, 4-methoxyphenyl, 4-tertiary-butylphenyl, 4-nitrophenyl, (1,1'-bis(cyclohexyl)-4,4'-methylene), 1,6-hexylene, 1-naphthyl, 2-naphthyl, N-morpholine, diphenylmethyl, 1,2-diphenyl-ethyl, phenylethyl, 2-methylphenyl, 3-methylphenyl, 4-methylphenyl, 2,6-dimethyl-phenyl, 1,2,3,4-tetrahydronaphthyl, or a 2-octyl group.

Preferably the ligating compound is of the formula

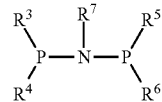

with $R^3$ to $R^7$ as defined above.

Preferably each of $R^3$ to $R^5$ is an alkyl (preferably methyl, ethyl or isopropyl) or aromatic (preferably phenyl or substituted phenyl).

The ligating compound may include a polymeric moiety to render the reaction product of the source of chromium and the said ligating compound to be soluble at higher temperatures and insoluble at lower temperatures e.g. 25° C. This approach may enable the recovery of the complex from the reaction mixture for re-use and has been used for other catalyst as described by D. E. Bergbreiter et al., *J. Am. Chem. Soc.*, 1987, 109, 177-179. In a similar vein these chromium catalysts can also be immobilised by binding the ligating compound to silica, silica gel, polysiloxane or alumina backbone as, for example, demonstrated by C. Yuanyin of al., *Chinese J. React. Pol.*, 1992, 1(2), 152-159 for immobilising platinum complexes.

The ligating compound may include multiple ligating units or derivatives thereof. Non-limiting examples of such ligands include dendrimeric ligands as well as ligands where the individual ligating units are coupled either via one or more of the R groups or via the linking group Y. More specific, but not limiting, examples of such ligands may include 1,2-di-(N(P (phenyl)$_2$)$_2$)-benzene, 1,4-di-(N(P(phenyl)$_2$)$_2$)-benzene, N(CH$_2$CH$_2$N(P(phenyl)$_2$)$_2$)$_3$,1,4-di-(P(phenyl)N(methyl)P (phenyl)$_2$)-benzene, 1,2-di-(N(P(p-methoxyphenyl)$_2$)$_2$)-benzene, 1,4-di-(N(P(p-methoxyphenyl)$_2$)$_2$)-benzene, N(CH$_2$CH$_2$N(P(p-methoxyphenyl)$_2$)$_2$)$_3$ and 1,4-di-(P(p-methoxyphenyl)N(methyl)P(p-methoxyphenyl)$_2$)-benzene.

The ligating compounds may be prepared using procedures known to one skilled in the art and procedures forming part of the state of the art.

The oligomerisation catalyst may be prepared in situ, that is in the reaction mixture in which the oligomerisation reaction is to take place. Often the oligomerisation catalyst will be prepared in situ. Alternatively the catalyst may be pre-formed or partly pre-formed.

Activation

Activator (iii)

The catalyst activator may be a compound that generates an active catalyst when the activator is combined with the source of chromium, the ligating compound and the olefinic compound.

Preferably the activator is an organoboron compound that includes a cation and a non-coordinating anion of the general formula

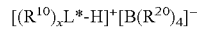

wherein:
L* is an atom selected from the group consisting of N, S and P; the cation [($R^{10}$)$_x$L*-H]$^+$ is a Bronsted acid;
x is an integer 1, 2 or 3;
each $R^{10}$ is the same or different when x is 2 or 3 and each is a —H, hydrocarbyl group or a heterohydrocarbyl group;

provided that at least one of $R^{10}$ comprises at least 6 carbon atoms and provided further that the total number of carbon atoms in $(R^{10})$, collectively is greater than 12;

$R^{20}$ independently at each occurrence is selected from the group consisting of hydride, dialkylamido, halide, alkoxide, aryloxide, hydrocarbyl, halosubstituted-hydrocarbyl radicals, halosubstituted-alkoxide, halosubstituted-aryloxide and a halosubstituted aromatic ring moiety with at least one halide substituent on the aromatic ring.

$[(R^{10})_x L^*-H]^+$ is a cation. More particularly, $[(R^{10})), L^*-H]^+$ is a Bronsted acid. A Bronsted acid is any compound that is capable of donating a hydrogen ion (proton).

Where L* is an atom selected from the group consisting of N or P, the cation $[(R^{10})_x L^*-H]^+$ may be represented by the formula

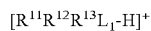

$[R^{11}R^{12}R^{13}L_1-H]^+$ wherein:
$L_1$=N or P;
$R^{11}$, $R^{12}$ and $R^{13}$ are the same or different and each is a —H, hydrocarbyl group or a heterohydrocarbyl group; and
provided that at least one of $R^{11}$, $R^{12}$ and $R^{13}$ comprises at least 6 carbon atoms and provided further that the total number of carbon atoms in $R^{11}$, $R^{12}$ and $R^{13}$ collectively is greater than 12.

Where L* is S, the cation $[(R^{10})_x L^*-H]^*$ may be represented by the formula

$[(R^{11}R^{12}L_2)_2-H]^+$ wherein:
$L_2$=S;
$R^{11}$ and $R^{12}$ are the same or different and each is a —H, hydrocarbyl group or a heterohydrocarbyl group; and
provided that at least one of $R^{11}$ and $R^{12}$ comprises at least 6 carbon atoms and provided further that the total number of carbon atoms in $R^{11}$ and $R^{12}$ collectively is greater than 12.

$R^{11}$, $R^{12}$ and $R^{13}$ are each independently an aliphatic hydrocarbyl or an aliphatic heterohydrocarbyl group, preferably a saturated aliphatic hydrocarbyl or a saturated aliphatic heterohydrocarbyl, more preferably a substituted hydrocarbyl or a substituted heterohydrocarbyl where the substituents may be non-polar groups.

Suitable examples of $R^{11}$, $R^{12}$ and $R^{13}$ include, but are not limited to, methyl, ethyl, ethylenyl, propyl, propenyl, propynyl, butyl, pentyl, hexyl, cyclohexyl, 2-methylcyclohexyl, 2-ethylcyclohexyl, octyl, 2-ethylhexyl, iso-octyl, decyl, dodecyl, tetradecyl, octadecyl, 2-isopropylcyclohexyl, benzyl, phenyl, tolyl, xylyl, o-methylphenyl, o-ethylphenyl, o-isopropylphenyl, o-t-butylphenyl, biphenyl, naphthyl and the like.

Examples of suitable non-polar substituents include, but are not limited to, butyl, pentyl, hexyl, sec-hexyl, cyclohexyl, 2-methylcyclohexyl, 2-ethylcyclohexyl, 2-isopropylcyclohexyl, cyclohexenyl, hexenyl, hexynyl, octyl, cyclo-octyl, cyclo-octenyl, 2-ethylhexyl, iso-octyl, decyl, benzyl, phenyl, tolyl, xylyl, o-methylphenyl, o-ethylphenyl, o-isopropylphenyl, o-t-butylphenyl, cumyl, mesityl, biphenyl, naphthyl, anthracenyl, and the like.

In one embodiment of the invention, at least one of $R^{10}$ comprises 6 to 40 carbon atoms with a total of from 13 to 100 carbons. Preferably, at least one of $R^{10}$ comprises 6 to 40 carbon atoms with a total of from 21 to 90 total carbons.

It is believed that the presence of long chain hydrocarbon substituents, that is hydrocarbon substituents having at least 6 carbon atoms, renders the activator more soluble in aliphatic solutions thereby facilitating activation of the catalyst. Moreover, it is believed that where the total number of carbon atoms in the hydrocarbyl substituents that $R^{11}$, $R^{12}$ and $R^{13}$ have is greater than 12, the solubility of the catalyst activator in aliphatic compounds will be increased thereby resulting in improved olefin oligomerisation with low solid formation.

As discussed herein above, $R^{20}$ may be a halosubstituted aromatic ring moiety with at least one halide substituent on the aromatic ring. In a preferred embodiment of the invention, the halosubstituted aromatic ring moiety is pentafluorophenyl.

The activator may also be or contain a compound that acts as a reducing or oxidising agent, such as sodium or zinc metal and the like, or oxygen and the like.

Illustrative, but non-limiting examples of organoboron compounds having a cation and a non-coordinating anion of the formula of the present invention, set out herein above, include
dihexyl(methyl)ammonium tetrakis(pentafluorophenyl)borate;
dioctyl(methyl)ammonium tetrakis(pentafluorophenyl)borate;
methyldi(octyl)ammonium tetrakis(pentafluorophenyl)borate;
decyldi(methyl)ammonium tetrakis(pentafluorophenyl)borate;
dodecyldi(methyl)ammonium tetrakis(pentafluorophenyl)borate;
tetradecyldi(methyl)ammonium tetrakis(pentafluorophenyl)borate;
hexaadecyldi(methyl)ammonium tetrakis(pentafluorophenyl)borate;
octadecyldi(methyl)ammonium tetrakis(pentafluorophenyl)borate;
eicosyldi(methyl)ammonium tetrakis(pentafluorophenyl)borate;
methyldi(decyl)ammonium tetrakis(pentafluorophenyl)borate;
methyldi(dodecyl)ammonium tetrakis(pentafluorophenyl)borate;
methyldi(tetradecyl)ammonium tetrakis(pentafluorophenyl)borate;
methyldi(hexadecyl)ammonium tetrakis(pentafluorophenyl)borate;
methyldi(octadecyl)ammonium tetrakis(pentafluorophenyl)borate;
methyldi(eicosyl)ammonium tetrakis(pentafluorophenyl)borate;
trihexylammonium tetrakis(pentafluorophenyl)borate;
trioctylammonium tetrakis(pentafluorophenyl)borate;
tri(2-ethylhexyl)ammonium tetrakis(pentafluorophenyl)borate;
tri(iso-octyl)ammonium tetrakis(pentafluorophenyl)borate;
tridecylammonium tetrakis(pentafluorophenyl)borate;
tridodecylammonium tetrakis(pentafluorophenyl)borate;
tritetradecylammonium tetrakis(pentafluorophenyl)borate;
trihexadecylammonium tetrakis(pentafluorophenyl)borate;
trioctadecylammonium tetrakis(pentafluorophenyl)borate;
trieicosylammonium tetrakis(pentafluorophenyl)borate;
hexyldi(n-butyl)ammonium tetrakis(pentafluorophenyl)borate;
octyldi(n-butyl)ammonium tetrakis(pentafluorophenyl)borate;

decyldi(n-butyl)ammonium tetrakis(pentafluorophenyl)borate;
dodecyldi(n-butyl)ammonium tetrakis(pentafluorophenyl)borate;
octadecyldi(n-butyl)ammonium tetrakis(pentafluorophenyl)borate;
N,N-dihexylanilinium tetrakis(pentafluorophenyl)borate;
N,N-dioctylanilinium tetrakis(pentafluorophenyl)borate;
N,N-didodecylanilinium tetrakis(pentafluorophenyl)borate;
N-methyl-N-dodecylanilinium tetrakis(pentafluorophenyl)borate;
N,N-di(octadecyl)(2,4,6-trimethylanilinium)tetrakis(pentafluorophenyl)borate;
cyclohexyldi(dodecyl)ammonium tetrakis(pentafluorophenyl)borate;
methyldi(dodecyl)ammonium tetrakis-(2,3,4,6-tetrafluorophenyl)borate;
trioctylphosphonium tetrakis(pentafluorophenyl)borate;
trihexylphosphonium tetrakis(pentafluorophenyl)borate;
tributylphosphonium tetrakis(pentafluorophenyl)borate;
dioctyl(methyl)phosphonium tetrakis(pentafluorophenyl)borate;
dimethyl(octyl)phosphonium tetrakis(pentafluorophenyl)borate;
bis(dihexylsulfide)onium tetrakis(pentafluorophenyl)borate, [{(C$_6$H$_{13}$)$_2$S}$_2$H][B(C$_6$F$_5$)$_4$];
bis(dioctylsulfide)onium tetrakis(pentafluorophenyl)borate, [{(C$_8$H$_{17}$)$_2$S}2H][B(C$_6$F$_5$)$_4$];
bis(didecylsulfide)onium tetrakis(pentafluorophenyl)borate, [{(C$_{10}$H$_{21}$)$_2$S}$_2$H][B(C$_6$F$_5$)$_4$]; and
bis(didodecylsulfide)onium tetrakis(pentafluorophenyl)borate, [{(C$_{12}$H$_{25}$)$_2$S}$_2$H][B(C$_6$F$_5$)$_4$].

The source of chromium and the organoboron compound may be combined in proportions to provide organoboron compound/chromium molar ratios from about 0.1 to 50 organoboron to 1 chromium, preferably from about 0.8 to 20 organoboron to 1 chromium, and more preferably from 1 to 10 organoboron to 1 chromium.

Preferably the concentration of the boron in the activated catalyst prior to dilution is at least 0.01 mmol/l. Preferably, the concentration of the boron is 0.1-100 mmol/l, and most preferably the concentration is 0.1-10 mmol/l.

Co-Activator

The process may also include a co-activator that is a compound not falling within the definition of the activator. Preferably the co-activator is an organoaluminium compound and/or an organoboron compound. Alternatively it may be an organic salt such as methyl lithium and/or methyl magnesium bromide, or an inorganic acid or salt such as tetrafluoroboric acid etherate, silver tetrafluoroborate, sodium hexafluoroantimonate, and the like.

Examples of suitable organoboron compounds are boroxines, triethylborane, tris(pentafluorophenyl)borane, tributyl borane and the like.

Suitable organoaluminium compounds include compounds of the formula Al(R$^9$)$_3$ (R$^9$ being the same or different), where each R$^9$ is independently an organyl group, a halogenated organyl group or a halide, with at least one of R$^9$ being an organyl group or a halogenated organyl group. Examples include trimethylaluminium (TMA), triethylaluminium (TEA), tri-isobutylaluminium (TIBA), tri-n-octylaluminium, methylaluminium dichloride, ethylaluminium dichloride, dimethylaluminium chloride, diethylaluminium chloride, aluminium isopropoxide, ethylaluminiumsesquichloride, methylaluminiumsesquichloride, and aluminoxanes.

Aluminoxanes are well known in the art as typically oligomeric compounds which can be prepared by the controlled addition of water to an alkylaluminium compound, for example trimethylaluminium. Such compounds can be linear, cyclic, cages or mixtures thereof. Mixtures of different aluminoxanes may also be used in the process.

In an embodiment of the invention the co-activator may comprise a compound of the formula

wherein
M' is selected from the group consisting of a group 3A atom, a group 4A atom and a metal atom, including an alkali metal atom and an alkaline earth metal atom;
n is 1 or a larger integer; and
R$^{8'}$ is an organic group, R$^8$ being the same or different when n is larger than 1.

Preferably M' is selected from the group consisting of a group 3A atom, a group 4A atom, and a transition metal atom. Preferably the R$^8$ group is bound to a group 3A atom. Preferably the group 3A atom is selected from the group consisting of Al and B, preferably it is Al.

The organic group R$^8$ may be an organyl group, and preferably it comprises a hydrocarbyl group, preferably it comprises an alkyl group, preferably methyl, ethyl or a larger alkyl group.

In one embodiment of the invention the co-activator comprises AlR$_3$" wherein R$^{8''}$ is an alkyl group.

The co-catalyst may be selected from the group consisting of trimethylaluminium (TMA); triethylaluminium (TEA), tributylaluminium, tri-isobutylaluminium (TIBA) and tri-n-octylaluminium.

It will be appreciated that TMA is relatively expensive and accordingly the use thereof may wish to be avoided. It has been found that by using an activator, as defined in the present invention, in combination with a co-activator as defined above (but excluding TMA and MAO), the use of TMA can be avoided as a co-catalyst.

It is foreseen that a co-activator as defined hereinabove will usually be used in combination with an activator as defined above.

The amount of co-activator employed may be up to 1000 equivalents relative to the chromium catalyst, but preferable is less than 600 equivalents. Preferably it is in the range between 30-300 equivalents relative to the chromium catalyst.

In use, where both an activator and a co-activator are used, the co-activator may be added first and the activator may be added subsequently.

Olefinic Compound to be Oligomerised

The olefinic compound may comprise a single olefinic compound or a mixture of olefinic compounds. In one embodiment of the invention it may comprise a single olefin.

The olefin may include multiple carbon-carbon double bonds, but preferably it comprises a single carbon-carbon double bond. The olefin may comprise an α-olefin with 2 to 30 carbon atoms, preferably 2 to 10 carbon atoms. The olefinic compound may be selected from the group consisting of ethylene, propene, 1-butene, 1-pentene, 1-hexene, 1-heptene, and 1-octene, 1-nonene, 1-decene, 3-methyl-1-pentene, 3-methyle-1-penetene, 4-methyl-1-pentene, styrene, p-methyl styrene, 1-dodecene or combinations thereof. Preferably, it comprises ethylene or propene, preferably ethylene. The ethylene may be used to produce hexene and/or octene, preferably 1-hexene and/or 1-octene.

Oligomerisation

The oligomerisation process may comprise a trimerisation process, alternatively or additionally it may comprise a tetramerisation process.

The process may be oligomerisation of two or more different olefinic compounds to produce an oligomer containing the reaction product of the two or more different olefinic compounds. Preferably however, the oligomerisation (preferably trimerisation and/or tetramerisation) comprises the oligomerisation of a single monomer olefinic compound.

In one preferred embodiment of the invention the oligomerisation process is oligomerisation of a single α-olefin to produce an oligomeric α-olefin. Preferably it comprises the trimerisation and/or tetramerisation of ethylene, preferably to 1-hexene and/or 1-octene.

Oligomeric Product

The oligomeric product may be an olefin, or a compound including an olefinic moiety. Preferably the oligomeric product includes an olefin, more preferably an olefin containing a single carbon-carbon double bond, and preferably it includes an α-olefin. The olefin product may include hexene, preferably 1-hexene, but more preferably it includes octene, preferably 1-octene. In a preferred embodiment of the invention the olefinic product includes a mixture of hexene and octene, preferably a mixture of 1-hexene and 1-octene.

In one preferred embodiment of the invention the oligomerisation process is a selective process to produce an oligomeric product containing more than 30% by mass of a single olefin product. The olefin product may be hexene, preferably 1-hexene, but alternatively it may be octene, preferably 1-octene.

Preferably the product contains at least 35% of the said olefin, preferably α-olefin, but it may be more than 40%, 50%, or even 60% by mass.

The olefinic product may be branched, but preferably it is non-branched.

Catalyst Preparation

It is foreseen that i) the source of chromium and ii) the said ligating compound (referred to in (a)) may be first reacted together and the resulting product may even be isolated, before combining it with the catalyst activator iii). However, i), ii) and iii) may be combined in any suitable order in the presence of the aliphatic solvent iv), but preferably at least some, but preferably all of i), ii) and iii) are first combined and subsequently contacted with the aliphatic solvent iv).

The contacting of the olefinic compound with compounds i) to iv) preferably takes place under conditions to allow oligomerisation of the olefinic compound. These conditions are well known to a person skilled in the art and include elevated temperatures and pressure. Oligomerisation may be carried out at temperatures from 100° C. to 250° C., but temperatures in the range of 15° C. to 130° C. are preferred, particularly temperatures in the range from 50° C. to 120° C. Oligomerisation is preferably carried out at a temperature of at least 0° C., more preferably at least 40° C., and most preferably at least 50° C. Preferably it is carried out at a pressure of at least 100 kPa, preferably at least 1000 kPa, preferably at least 3000 kPa.

The source of chromium and ligating compound may be combined to provide any suitable molar ratio, preferably a chromium to ligand compound molar ratio, from about 0.01:100 to 10 000:1, preferably from about 0.1:1 to 10:1.

The process may also include combining one or more different sources of chromium with one or more different ligating compounds.

The oligomerisation catalyst or its individual components, in accordance with the invention, may also be immobilised by supporting it on a support material, for example, silica, alumina, $MgCl_2$, zirconia, artificial hectorite or smectorite clays such as Laponite™ RD or mixtures thereof, or on a polymer, for example polyethylene, polypropylene, polystyrene, or poly(aminostyrene). The catalyst can be formed in situ in the presence of the support material, or the support can be pre-impregnated or premixed, simultaneously or sequentially, with one or more of the catalyst components or the oligomerisation catalyst. In some cases, the support material can also act as a component of the activator. This approach would also facilitate the recovery of the catalyst from the reaction mixture for reuse.

It is known that other components (hydrogen, oxygen, and the like) may have an effect on the oligomerisation reaction and is present in some ethylene feedstocks.

Aliphatic Solvent

The said oligomerisation is carried out in a liquid medium. Preferably the liquid medium is an inert liquid medium. The liquid medium comprises an aliphatic medium and the aliphatic liquid medium may comprise an acyclic or cyclic compound or mixtures thereof. The cyclic compound may include heteroatoms (that is atoms other that H and C), but preferably comprises a cyclic hydrocarbon. The cyclic hydrocarbon may include one or more unsaturated carbon atoms, but preferably it is a saturated cyclic hydrocarbon. The ring structure of the saturated cyclic hydrocarbon may consist of 3 to 12 carbon atoms, preferably 5 to 8 carbon atoms. In one embodiment of the invention the ring structure of the saturated cyclic hydrocarbon may consist of 6 carbon atoms.

In one preferred embodiment of the invention the aliphatic liquid medium may comprise isoparaffinic/hydrocarbon fluid, cyclohexane or methylcyclohexane. Isoparaffinic/hydrocarbon fluid, particularly Isopar C, 2,2,4-trimethylpentane (TMP), 1-decene, 1-dodecene, 1-tetradecenes, the $C_{10}$-$C_{14}$ cut of the product mixture produced by the catalyst and methylcyclohexane (MCH) are especially suitable from a product separation/solvent recycle point of view in oligomerisation of ethylene.

It has been found that aliphatic liquid mediums such as cyclohexane provide more active reaction systems (compared to aromatic liquid mediums) which can reduce catalyst usage. Aliphatic liquid mediums are also more environmentally friendly than aromatic compounds.

In a preferred embodiment of the invention the liquid medium is a solvent for the olefinic compound and/or the oligomerisation catalyst, preferably of both.

The invention further provides for a process for producing an oligomeric product. In this regard, the olefinic compound or mixture thereof to be oligomerised can be introduced into the process in a continuous or batch fashion.

Preferably, the reaction conditions of the process are chosen such to produce oligomers (especially trimers and/or tetramers) in high yield by selectively converting an ethylenic feedstock such as ethylene.

The process may include a process for the oligomerisation (especially tri- or tetramerisation) of ethylene or propylene or a mixture of olefins to yield an oligomerised product selectively.

The reaction products derived from the oligomerisation reaction as described herein, may be prepared using the disclosed catalyst by a homogeneous liquid phase reaction in the presence or absence of an inert solvent, and/or by slurry reaction where the catalyst and the polymeric product is in a form that displays little or no solubility, and/or a two-phase liquid/liquid reaction, and/or a bulk phase reaction in which neat reagent and/or product olefins serve as the dominant medium, and/or gas phase reaction, using conventional equipment and contacting techniques.

According to another aspect of the present invention, there is provided an oligomerisation product produced by the process substantially as described hereinabove.

The invention will now be further described by means of the following non-limiting examples. The individual components of the examples may conceivably be omitted or substituted and although not necessarily ideal, the invention may conceivably still be performed and these components are not to be taken as essential to the working of the invention.

EXAMPLES

General catalysis was performed in either a 300 mL volume Autoclave Engineers Reactor equipped with a stainless steel vessel with detachable thermal-fluid jacket or a 1.2 L Premex autoclave with a stainless steel vessel with integral thermal-fluid jacket. Both reactors are equipped with mechanical gas-entraining stirring, and internal cooling coil. Ethylene (Grade 4.5) was supplied by Linde and passed through scrubbing columns prior to use; ethylene flow was measured using a Siemens Sitrans F C Massflo system (Mass 6000-Mass 2100) and the data logged. GC analysis was performed using an Agilent Technologies 6850 Network GC System equipped with PONA column (50 m×0.20 mm×0.50 μm) using hydrogen as carrier gas. All catalytic tests were allowed to run until ethylene uptake had ceased, either due to catalyst deactivation or because the autoclave had filled.

A mixed chromium (1.25 μmol/mL)/ligand (1.5 μmol/mL) stock solution was prepared in the relevant solvent. The trialkylaluminium reagents were diluted with the relevant solvent to 0.5 M. The activator salts were used as 1.5 μmol/mL stock solutions in the relevant solvent.

The activator salts employed in the following examples are selected from the activator salts set out in the first column of Table 1 and of Table 2.

Standard Ethylene Tetramerisation Reactions in 300 mL Autoclave

A 300 mL stainless steel reactor was heated to 90° C. under vacuum for 30 minutes. After cooling to 60° C. the reactor was purged 7 times with 8 bar Ar. The reactor was vented to 1 bar and charged with the solvent (65 mL) and placed under 10 bar pressure of ethylene. Trialkylaluminium (187.5 μmol) in the relevant solvent was added to a solution of chromium (1.25 μmol)/ligand (1.5 μmol) in the relevant solvent, in a Schlenk, and stirred for 30 seconds. Addition of activator salt (1.5 μmol) in cyclohexane preceded stirring for a further 1 minute. The reactor pressure was reduced to 1 bar at which point the activation solution was added and the reactor immediately pressurized to 50 bar with ethylene. The pressure was kept constant throughout the reaction by the continuous addition of ethylene which was monitored via a flow-meter. Once ethylene uptake had ceased, the gas supply was closed and the reactor cooled in an ice/water bath. Excess ethylene was bled and the reactor contents treated sequentially with 1000 μL of nonane (GC internal standard), MeOH and 10% HCl. A sample of the organic phase was taken for GC-FID analysis. Any solid formed was collected, washed repeatedly with 10% HCl and EtOH, dried overnight and weighed.

Standard Ethylene Tetramerisation Reactions in 1.2 L Autoclave

A 1.2 L stainless steel reactor was heated to 120° C. under vacuum for 30 minutes. After cooling to 60° C. the reactor was purged 7 times with 8 bar Ar. At 8 bar the reactor was charged with solvent (200 mL) via a HPLC pump. The pressure was reduced to 1 bar and a solution of trialkylaluminium (462.5 μmol) in solvent was added and the reactor placed under 10 bar ethylene pressure. Trialkylaluminium (62.5 μmol) in solvent was added to a solution of chromium (1.25 μmol)/ligand (1.5 μmol) in solvent, in a Schlenk, and stirred for 30 seconds. Addition of activator salt (1.5 μmol) in solvent preceded stirring for a further 1 minute. The reactor pressure was reduced to 1 bar at which point the activation solution was added and the reactor immediately pressurized to 50 bar with ethylene. The pressure was kept constant throughout the reaction by the continuous addition of ethylene which was monitored via a flow-meter. Once ethylene uptake had ceased, the gas supply was closed and the reactor cooled to −10° C. Excess ethylene was bled and the reactor contents treated sequentially with 1000 μL of nonane (GC internal standard), MeOH and 10% HCl. A sample of the organic phase was taken for GC-FID analysis. Any solid formed was collected, washed repeatedly with 10% HCl and EtOH, dried overnight and weighed.

The results obtained with the various relevant solvents, and different ligands and activator salts are reflected in the tables below.

TABLE 1

Varying ammonium borate salt

| Example No | Activator salt | Cr source + Ligand | Solvent | Productivity g/gCr |
|---|---|---|---|---|
| Comparative example 1 | $[Me_2N(H)(Bu)]$ $[B(C_6F_5)_4]$ C1, C1, C4 189 | $Cr(2\text{-ethylhexanoate})_3 + Ph_2P\text{—}N\{C(H)(Me)(\{CH_2\}_5CH_3)\}\text{—}PPh_2$ | Cyclohexane | 32,533 |
| Comparative example 2 | $[Pr_2N(H)(Me)]$ $[B(C_6F_5)_4]$ C1, C3, C3 188 | $Cr(2\text{-ethylhexanoate})_3 + Ph_2P\text{—}N\{C(H)(Me)(\{CH_2\}_5CH_3)\}\text{—}PPh_2$ | Cyclohexane | 98.104 |
| Comparative example 3 | $[Me_2N(H)(C_6H_{13})]$ $[B(C_6F_5)_4]$ C1, C1, C6 143 | $Cr(2,2,6,6\text{-tetramethyl-3,5-heptanedionato})_3 + Ph_2P\text{—}N\{C(H)(Me)(\{CH_2\}_5CH_3)\}\text{—}PPh_2$ | Cyclohexane | 112,468 |
| Comparative example 4 | $[Me_2N(H)(Ph)]$ $[B(C_6F_5)_4]$ C1,C1,C6(Ar) 98 | $Cr(2,2,6,6\text{-tetramethyl-3,5-heptanedionato})_3 + Ph_2P\text{—}N\{C(H)(Me)(\{CH_2\}_5CH_3)\}\text{—}PPh_2$ | Cyclohexane | 52,442 |
| Example 1 | $[(C_{18}H_{37})_2N(H)(Me)]$ $[B(C_6F_5)_4]$ | $Cr(2,2,6,6\text{-tetramethyl-3,5-heptanedionato})_3 + Ph_2P\text{—}$ | Cyclohexane | 1,005,394 |

TABLE 1-continued

Varying ammonium borate salt

| | | | | |
|---|---|---|---|---|
| Example 2 | C18, C18, C1 45 [(C$_6$H$_{13}$)$_2$N(H)(Ph)] [B(C$_6$F$_5$)$_4$] | N{C(H)(Me)({CH$_2$}$_5$CH$_3$)}—PPh$_2$ Cr(2,2,6,6-tetramethyl-3,5-heptanedionato)$_3$ + Ph$_2$P— N{C(H)(Me)({CH$_2$}$_5$CH$_3$)}—PPh$_2$ | Cyclohexane | 1,023,825 |
| Example 3 | C6, C6, C6(Ar) 46 [(C$_8$H$_{17}$)$_3$N(H)] [B(C$_6$F$_5$)$_4$] C8, C8, C8 52 | Cr(2,2,6,6-tetramethyl-3,5-heptanedionato)$_3$ + Ph$_2$P— N{C(H)(Me)({CH$_2$}$_5$CH$_3$)}—PPh$_2$ | Cyclohexane | 877,086 |
| Example 4 | [(C$_8$H$_{17}$)$_2$N(Me)(H)] [B(C$_6$F$_5$)$_4$] C8, C8, C1 130 | Cr(2,2,6,6-tetramethyl-3,5-heptanedionato)$_3$ + Ph$_2$P— N{C(H)(Me)({CH$_2$}$_5$CH$_3$)}—PPh$_2$ | Cyclohexane | 470,784 |

| Example No | Activity g/gCr/h | time (min) | C$_6$ (1-C$_6$)% | C$_8$ (1-C$_8$)% | Total α 1-C$_6$ + 1-C$_8$% | C$_{10-14}$% | C$_{15+}$ % | PE % |
|---|---|---|---|---|---|---|---|---|
| Comparative example 1 | 25,150 | 78 | 70.4 (96.7) | 19.6 (88.1) | 85.4 | 3.9 | 3.1 | 77.6 |
| Comparative example 2 | 70,388 | 84 | 23.6 (81.6) | 70.1 (98.2) | 88.1 | 2.0 | 0.8 | 19.4 |
| Comparative example 3 | 39,931 | 169 | 70.8 (98.4) | 19.9 (96.5) | 88.8 | 3.4 | 4.3 | 76.5 |
| Comparative example 4 | 40.430 | 78 | 81.7 (98.5) | 13.8 (83.2) | 92.0 | 1.3 | 0.7 | 63.3 |
| Example 1 | 2,478,579 | 24 | 26.9 (79.3) | 66.0 (99.4) | 87.0 | 5.1 | 1.0 | 0.57 |
| Example 2 | 1,119,791 | 55 | 26.2 (78.5) | 67.0 (99.5) | 87.2 | 4.9 | 0.9 | 1.6 |
| Example 3 | 740,855 | 71 | 27.7 (80.7) | 65.7 (99.5) | 87.7 | 4.9 | 0.7 | 2.2 |
| Example 4 | 371,652 | 76 | 22.2 (80.6) | 70.6 (99.3) | 88.0 | 4.9 | 1.6 | 5.7 |

General conditions: 1.25 μmol Cr; 1.2 eq Ligand; 1.2 eq borate activator; 150 eq AlEt$_3$; p(=) 50 bar; 60° C.; 70 mL solvent; 300 mL rig.

TABLE 2

1.2 L Varying Cr source and solvent

| Example No | Activator salt | Cr source + Ligand | Solvent | Productivity g/gCr |
|---|---|---|---|---|
| Example 5 | [(C$_8$H$_{17}$)$_3$N(H)] [B(C$_6$F$_5$)$_4$] C8, C8, C8 424 | Cr(2,2,6,6-tetramethyl-3,5-heptanedionato)$_3$ + Ph$_2$P— N{C(H)(Me)({CH$_2$}$_5$CH$_3$)}—PPh$_2$ | Cyclohexane | 6,018,430 |
| Example 6 | [(C$_{18}$H$_{37}$)$_2$N(H)(Me)] [B(C$_6$F$_5$)$_4$] C18, C18, C1 122 | Cr(2-ethylhexanoate)$_3$ + Ph$_2$P— N{C(H)(Me)(C{H}{Me}(CH$_2$)$_4$CH$_3$)}— PPh$_2$ | Methylcyclohexane | 5,107,934 |
| Example 7 | [(C$_{18}$H$_{37}$)$_2$N(H)(Me)] [B(C$_6$F$_5$)$_4$] C18, C18, C1 110 | Cr(2-ethylhexanoate)$_3$ + Ph$_2$P— N{C(H)(Me)(C{H}{Me}(CH$_2$)$_4$CH$_3$)}— PPh$_2$ | 2,2,4-Trimethylpentane | 5,151,682 |
| Example 8 | [(C$_{18}$H$_{37}$)$_2$N(H)(Me)] [B(C$_6$F$_5$)$_4$] C18, C18, C1 72 | Cr(2,2,6,6-tetramethyl-3,5-heptanedionato)$_3$ + Ph$_2$P— N{C(H)(Me)({CH$_2$}$_5$CH$_3$)}—PPh$_2$ | 1-tetradecene | 6,547,938 |
| Example 9 | [(C$_{18}$H$_{37}$)$_2$N(H)(Me)] [B(C$_6$F$_5$)$_4$] C18, C18, C1 89 | Cr(acac)$_3$ + Ph$_2$P—N{C(H)(Me)($^i$Pr)}—PPh$_2$ | Cyclohexane | 5,654,616 |

| Example No | Activity g/gCr/h | time (min) | C$_6$ (1-C$_6$) % | C$_8$ (1-C$_8$) % | Total α 1-C$_6$ + 1-C$_8$% | C$_{10-14}$ % | C$_{15+}$ % | PE % |
|---|---|---|---|---|---|---|---|---|
| Example 5 | 1,744,506 | 207 | 22.4 (81.4) | 65.3 (99.2) | 83.0 | 9.7 | 1.9 | 0.85 |
| Example 6 | 3,295,441 | 93 | 31.5 (90.2) | 57.6 (99.5) | 85.7 | 9.6 | 0.8 | 0.48 |

TABLE 2-continued

| | | 1.2 L Varying Cr source and solvent | | | | | | |
|---|---|---|---|---|---|---|---|---|
| Example 7 | 3,034,864 | 102 | 32.4 (91.0) | 56.4 (99.4) | 85.5 | 9.8 | 0.8 | 0.51 |
| Example 8 | 4,880,451 | 80.5 | 19.5 (79.6) | 59.2 (99.2) | 74.3 | 10.2 | 10.2 | 0.26 |
| Example 9 | 2,875,228 | 118 | 28.9 (88.6) | 60.3 (99.5) | 85.6 | 9.3 | 0.6 | 0.4 |

General conditions: 1.25 μmol Cr; 1.2 eq Ligand; 1.2 eq borate activator; 420 eq AlEt$_3$; p(=) 50 bar; 60° C.; 200 mL solvent; 1.2 L rig.

TABLE 3

Varying trialkylaluminium

| Example No | Activator salt | AlR$_3$ | Productivity g/gCr | Activity g/gCr/h | time (min) | C$_6$ (1-C$_6$) % | C$_8$ (1-C$_8$) % | Total α 1-C$_6$+ 1-C$_8$% | C$_{10-14}$ % | C$_{15+}$ % | PE % |
|---|---|---|---|---|---|---|---|---|---|---|---|
| Example 10 | [(C$_{18}$H$_{37}$)$_2$N(H)(Me)] [B(C$_6$F$_5$)$_4$] C18, C18, C1 434 | Al$^i$Bu$_3$ | 6,467,593 | 2,874,486 | 135 | 22.1 (81.1) | 65.7 (99.2) | 83.1 | 9.4 | 1.9 | 2.4 |

General conditions: 1.25 μmol Cr(2,2,6,6-tetramethyl-3,5-heptanedionato)$_3$; 1.2 eq Ph$_2$P—N{C(H)(Me)({CH$_2$}$_5$CH$_3$)}—PPh$_2$; 420 eq AlR$_3$; p(=) 50 bar; 60° C.; 200 mL cyclohexane; 1.2 L rig.

TABLE 4

Varying ligand

| Example No | Ligand | Productivity g/gCr | Activity g/gCr/h | time (min) | C$_6$ (1-C$_6$) % | C$_8$ (1-C$_8$) % | Total α 1-C$_6$+ 1-C$_8$% | C$_{10-14}$ | C$_{15+}$ % | PE % |
|---|---|---|---|---|---|---|---|---|---|---|
| Example 11 $^a$ | Ph$_2$P—N(CH$_2$CH$_2$$^i$Pr)—N(Me)—PPh$_2$ 455 | 1,018,828 | 1,176,385 | 52 | 63.3 (95.9) | 31.9 (99.2) | 92.3 | 4.5 | 0.1 | 2.7 |
| Example 12 | Ph$_2$P—N{C(H)($^i$Pr)(Et)}—PPh$_2$ 169 | 4,977,109 | 2,478,571 | 121 | 33.4 (90.7) | 55.7 (99.3) | 85.6 | 9.6 | 0.7 | 0.45 |
| Example 13 | Ph$_2$P—N{C(H)($^i$Pr)($^n$Pr)}—PPh$_2$ 167 | 4,915,673 | 2,023,373 | 146 | 32.6 (90.3) | 56.9 (99.2) | 85.9 | 9.2 | 0.74 | 0.8 |
| Example 14 | Ph$_2$P—N{C{H}(Me)(C{H}{Me}(CH$_2$)$_4$CH$_3$)}—PPh$_2$ 142 | 5,412,989 | 4,188,899 | 78 | 32.1 (90.4) | 57.3 (99.4) | 85.9 | 9.4 | 0.7 | 0.51 |
| Example 15 | Ph$_2$P—N{C(H)(Me)($^i$Pr)}—PPh$_2$ 91 | 5,072,238 | 2,441,837 | 125 | 30.1 (89.3) | 59.6 (99.6) | 86.2 | 8.1 | 0.6 | 0.35 |
| Example 16 | Ph$_2$P—N{C(H)(Me)(C{Me}{—CH$_2$—CH$_2$—})}—PPh$_2$ 206 | 2,659,821 | 4,338,629 | 36.8 | 34.9 (92.4) | 56.8 (99.6) | 88.8 | 7.0 | 0.43 | 0.49 |

General conditions: 1.25 μmol Cr(2-ethylhexanoate)$_3$; 1.2 eq Ligand; 1.2 eq [(C$_{18}$H$_{37}$)$_2$N(H)(Me)][B(C$_6$F$_5$)$_4$]; 420 eq AlEt$_3$; p(=) 50 bar; 60° C.; 200 mL methylcyclohexane; 1.2 L rig.
$^a$ Cr(2,2,6,6-tetramethyl-3,5-heptanedionato)$_3$ and cyclohexane.

The first entry in Table 1 is a comparative example indicating borate activators that are not soluble in aliphatic liquids. The remaining entries in said Table 1 represent borate activators according to the present invention. These borate activators are soluble in aliphatic liquids. Owing to the solubility of these activators, the resultant catalyst activities are markedly higher than the catalyst activity obtained for the first entry borate activator. Furthermore, there is a noticeable reduction in solids formation when compared to the formation of solids obtained when the first entry borate activator is employed.

The results tabulated in Table 1 and Table 2 above have been obtained under comparable conditions, save for the fact that the results indicated in Table 2 are obtained from experiments conducted in a larger scale reactor.

The invention claimed is:

1. A process for producing an oligomeric product by the oligomerisation of at least one olefinic compound, the process including (a) providing an activated oligomerisation catalyst by combining, in any order,
    i) a source of chromium;
    ii) a ligating compound of the formula

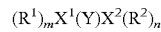

$(R^1)_m X^1 (Y) X^2 (R^2)_n$ wherein: $X^1$ and $X^2$ are independently an atom selected from the group consisting of nitrogen, phosphorus, arsenic, antimony, bismuth, oxygen, sulphur and selenium or said atom oxidized by S, Se, N or O where the valence of $X^1$ and/or $X^2$ allows for such oxidation;
    Y is a linking group between $X^1$ and $X^2$ which linking group contains at least one nitrogen atom which is directly bonded to $X^1$ or $X^2$;
    m and n are independently 0, 1 or a larger integer; and
    $R^1$ and $R^2$ are independently hydrogen, a hydrocarbyl group, an organoheteryl group or a heterohydrocarbyl group, and the respective $R^1$ groups are the same or different when m>1, and the respective $R^2$ groups are the same or different when n>1;
  iii) a catalyst activator which is an organoboron compound including a cation and a non-coordinating anion of the general formula

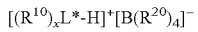

wherein:
  $L^*$ is an atom selected from the group consisting of N, S and P;
  the cation $[(R^{10})_xL^*-H]$ is a Bronsted acid;
  x is an Integer 1, 2 or 3;
  each $R^{10}$ is the same or different when x is 2 or 3 and each is a —H, hydrocarbyl group or a heterohydrocarbyl group;
  provided that at least one of $R^{10}$ comprises at least 6 carbon atoms and provided further that the total number of carbon atoms in $(R^{10})_x$ collectively is greater than 12;
  $R^{20}$ independently at each occurrence is selected from the group consisting of hydride, dialkylamido, halide, alkoxide, aryloxide, hydrocarbyl, halosubstituted hydrocarbyl radicals, halosubstituted-alkoxide, halosubstituted-aryloxide and a halosubstituted aromatic ring moiety with at least one halide substituent on the aromatic ring; and
  iv) an aliphatic hydrocarbon fluid solvent; and
(b) contacting the at least one olefinic compound with the activated oligomerisation catalyst to produce an oligomeric product; and wherein the oligomeric product contains less than 5.7 weight percent polyethylene.

2. A process for activating an oligomerisation catalyst to produce an oligomeric product, the process comprising the combination, in any order, of
  i) a source of chromium;
  ii) a ligating compound of the formula $$(R^1)_mX^1(Y)X^2(R^2)_n$$

wherein:
  $X^1$ and $X^2$ are independently an atom selected from the group consisting of nitrogen, phosphorus, arsenic, antimony, bismuth, oxygen, sulphur and selenium or said atom oxidized by S, Se, N or O where the valence of $X^1$ and/or $X^2$ allows for such oxidation;
  Y is a linking group between $X^1$ and $X^2$ which linking group contains at least one nitrogen atom which is directly bonded to $X^1$ or $X^2$;
  m and n are independently 0, 1 or a larger integer; and
  $R^1$ and $R^2$ are independently hydrogen, a hydrocarbyl group an organoheteryl group or a heterohydrocarbyl group, and the respective $R^1$ groups are the same or different when m>1, and the respective $R^2$ groups are the same or different when n>1;
  iii) a catalyst activator which is an organoboron compound including a cation and a non-coordinating anion of the general formula)

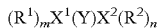

wherein:
  $L^*$ is an atom selected from the group consisting of N, S and P;
  the cation $[(R^{10})_xL^*-H]^*$ is a Bronsted acid;
  x is an integer 1, 2 or 3;
  each $R^{10}$ is the same or different and each is a —H, hydrocarbyl group or a heterohydrocarbyl group;
  provided that at least one of $R^{10}$ comprises at least 6 carbon atoms and provided further that the total number of carbon atoms in $(R)_x$ collectively is greater than 12;
  $R^{20}$ independently at each occurrence is selected from the group consisting of hydride, dialkylamido, halide, alkoxide, aryloxide, hydrocarbyl, halosubstituted-hydrocarbyl radicals, halosubstituted-alkoxide, halosubstituted-aryloxide and a halosubstituted aromatic ring moiety with at least one halide substituent on the aromatic ring; and
  (iv) an aliphatic hydrocarbon fluid solvent; and wherein the oligomeric product contains less than 5.7 weight percent polyethylene.

3. The process of claim 1 or claim 2 wherein $X^1$ and $X^2$ are the same, and are both P.

4. The process of claim 1 or claim 2 wherein the ligating compound is of the formula

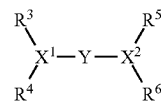

wherein Y is as defined in claim 1 or claim 2, $X^1$ and $X^2$ are independently selected from the group consisting of nitrogen, phosphorus, arsenic, antimony and bismuth and $R^3$ to $R^6$ are each independently a hydrocarbyl group or a heterohydrocarbyl group.

5. The process of claim 4 wherein $R^3$ to $R^6$ are selected from the group consisting of metallocenes.

6. The process of claim 4 wherein none of $R^3$ to $R^6$ are aromatic with a ring atom of the aromatic ring structure bound to either $X$ or $X^2$ and with a polar substituent as a non-ring atom bound to a ring atom of the aromatic ring structure adjacent to the ring atom bound to $X^1$ or $X^2$.

7. The process of claim 4 wherein, if two or more of $R^3$ to $R^6$ are aromatic with a ring atom of the aromatic ring structure bound to either $X^1$ and $X^2$ then not more than two of said aromatic $R^3$ and $R^6$ have a substituent as a non-ring atom bound to a ring atom of the aromatic ring structure adjacent to the ring atom bound to $X^1$ or $X^2$.

8. The process of claim 1 or claim 2 wherein Y is selected from the group consisting of an inorganic linking group comprising either a single- or two atom linker spacer; and a group comprising 1,2-diarylhydrazine-1,2-diyl(-N(Ar)-N(Ar)-) where Ar is an aryl group; 1,2-dialkylhydrazine-1,2-diyl(-N(Alk)-N(Alk)-) where Alk is an alkyl group; —B($R^7$)—, —Si($R^7$)$_2$—, —P($R^7$)— and —N($R^7$)— where $R^7$ is hydrogen, a hydrocarbyl or heterocarbyl or halogen.

9. The process of claim 1 or claim 2 wherein $L^*$ is an atom selected from the group consisting of N and P, and the cation $[(R^{10})_xL^*-H]^*$ is represented by the formula

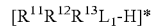

wherein:
  $L_1$=N or P;
  $R^{11}$, $R^{12}$ and $R^{13}$ are the same or different and each is a —H, hydrocarbyl group or a heterohydrocarbyl group; and
  provided that at least one of $R^{11}$, $R^{12}$ and $R^{13}$ comprises at least 6 carbon atoms and provided further that the total number of carbon atoms in $R^{11}$, $R^{12}$ and $R^{13}$ collectively is greater than 12.

10. The process of claim 1 or claim 2 wherein $L^*$ is S, and the cation $[(R^{10})_xL^*-H]$ is represented by the formula

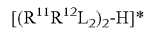

wherein:

$L_2 = S$;

$R^{11}$ and $R^{12}$ are the same or different and each is a —H, hydrocarbyl group or a heterohydrocarbyl group; and provided that at least one of $R^{11}$ and $R^{12}$ comprises at least 6 carbon atoms and provided further that the total number of carbon atoms in $R^1$ and $R^2$ collectively Is greater than 12.

11. The process of claim 9 wherein $R^{11}$, $R^{12}$ and $R^{13}$ are each independently an aliphatic hydrocarbyl or an aliphatic heterohydrocarbyl group.

12. The process of claim 1 or claim 2 wherein the source of chromium and the organoboron compound may be combined in proportions to provide organoboron compound/chromium molar ratios from about 0.1 to 50 organoboron to 1 chromium.

13. The process of claim 1 or claim 2 which further Includes the addition of a co-activator that is a compound not falling within the definition of the activator and wherein the co-activator Is selected from the group consisting of:

an organoaluminium compound and an organoboron compound and combinations thereof; organic salts selected from the group consisting of methyl lithium and methyl magnesium bromide and combinations thereof; and the group of salts of inorganic acids consisting of tetrafluoroboric acid etherate, silver tetrafluoroborate, sodium hexafluoroantimonate, and the like.

14. The process of claim 1 or claim 2 which further includes the addition of a co-activator which is a compound of the formula $M(R^8)_n$, wherein M is selected from the group consisting of a group 3A atom, a group 4A atom and a metal atom, including an alkali metal atom and an alkaline earth metal atom;

n is 1 or a larger integer; and $R^8$ is an organic group, and the respective $R^8$ groups are the same or different when n is larger than 1.

15. The process of claim 13 wherein the amount of co-activator employed is up to 1000 equivalents relative to the chromium catalyst.

16. An oligomerisation product produced by the process claimed in claim 1 or claim 2.

17. The process of claim 10 wherein $R^{11}$ and $R^{12}$ are each independently an aliphatic hydrocarbyl or an aliphatic heterohydrocarbyl group.

18. The process of claim 14 wherein the amount of co-activator employed is up to 1000 equivalents relative to the chromium catalyst.

19. The process of claim 11 wherein $R^{11}$, $R^{12}$ and $R^{13}$ are each independently a saturated aliphatic hydrocarbyl or a saturated aliphatic heterohydrocarbyl.

20. The process of claim 11 wherein $R^{11}$, R and $R^{13}$ are each independently a substituted hydrocarbyl or a substituted heterohydrocarbyl where the substitutents may be non-polar groups.

21. The process of claim 17 wherein $R^{11}$ and $R^{12}$ are each independently a saturated aliphatic hydrocarbyl or a saturated aliphatic heterohydrocarbyl.

22. The process of claim 17 wherein $R^{11}$ and $R^{12}$ are each independently a substituted hydrocarbyl or a substituted heterohydrocarbyl where the substitutents may be non-polar groups.

* * * * *

UNITED STATES PATENT AND TRADEMARK OFFICE
CERTIFICATE OF CORRECTION

PATENT NO. : 9,035,119 B2
APPLICATION NO. : 13/201306
DATED : May 19, 2015
INVENTOR(S) : Sean William Ewart et al.

It is certified that error appears in the above-identified patent and that said Letters Patent is hereby corrected as shown below:

In the Claims

Claim 10, col. 23, line 7, "Is" should read -- is --.

Claim 13, col. 23, line 18, "Includes" should read -- includes --.

Claim 13, col. 23, line 20, "Is" should read -- is --.

Claim 14, col. 23, line 31, "$M(R^8)_n$" should read -- $M(R^8)_n$. --.

Claim 20, col. 24, line 20, "$R^{11}$, R, $R^{13}$" should read -- $R^{11}$, $R^{12}$, $R^{13}$ --.

Signed and Sealed this
Twenty-sixth Day of January, 2016

Michelle K. Lee
*Director of the United States Patent and Trademark Office*